United States Patent
Kawamura et al.

(10) Patent No.: US 8,201,396 B2
(45) Date of Patent: Jun. 19, 2012

(54) EXHAUST GAS CLEANING APPARATUS FOR INTERNAL COMBUSTION ENGINE

(75) Inventors: Jun Kawamura, Aichi-ken (JP); Masakuni Yokoyama, Tokai (JP)

(73) Assignee: Denso Corporation, Kariya (JP)

( * ) Notice: Subject to any disclaimer, the term of this patent is extended or adjusted under 35 U.S.C. 154(b) by 613 days.

(21) Appl. No.: 12/389,531

(22) Filed: Feb. 20, 2009

(65) Prior Publication Data

US 2009/0205317 A1    Aug. 20, 2009

(30) Foreign Application Priority Data

Feb. 20, 2008  (JP) ................................. 2008-038715

(51) Int. Cl.
*F01N 3/00*    (2006.01)

(52) U.S. Cl. ................ 60/295; 60/299; 60/301

(58) Field of Classification Search .............. 60/285, 60/299, 301
See application file for complete search history.

(56) References Cited

U.S. PATENT DOCUMENTS

| | | | |
|---|---|---|---|
| 5,473,887 A | 12/1995 | Takeshima et al. | |
| 6,227,163 B1 | 5/2001 | Enoki et al. | |
| 6,712,053 B2 | 3/2004 | Kobayashi et al. | |
| 6,857,414 B2 | 2/2005 | Ogawa et al. | |
| 7,163,007 B2 | 1/2007 | Sasaki et al. | |

FOREIGN PATENT DOCUMENTS

| | | |
|---|---|---|
| JP | 2600492 | 1/1997 |
| JP | 11-200929 | 7/1999 |
| JP | 2001-193524 | 7/2001 |
| JP | 2002-327634 | 11/2002 |
| JP | 2004-204685 | 7/2004 |
| JP | 2005-155474 | 6/2005 |
| JP | 2006-200460 | 8/2006 |
| JP | 2006-336518 | 12/2006 |

OTHER PUBLICATIONS

Japanese Office Action dated Apr. 19, 2011, issued in corresponding Japanese Application No. 2008-038715 with English Translation.
Office Action (2 pgs.) dated Jul. 28, 2011 issued in corresponding Japanese Application No. 2008-038715 with an at least partial English-language translation thereof (2 pgs.).

*Primary Examiner* — Kenneth Bomberg
*Assistant Examiner* — Abdul Elnoubi
(74) *Attorney, Agent, or Firm* — Nixon & Vanderhye P.C.

(57) ABSTRACT

An exhaust gas cleaning apparatus includes a combustion mode shifter that shifts combustion in a cylinder of an engine from a lean-burn mode to a rich-burn mode for enabling a LNT to reduce NOx contained in the exhaust gas. The combustion mode shifter is configured to: estimate a torque-producing fuel quantity for a fuel injection made by a fuel injector when the combustion is in the lean-burn mode; estimate an excess oxygen ratio for an upcoming fuel injection during the shifting of the combustion from the lean-burn mode to the rich-burn mode; estimate a fuel burning percentage for the upcoming fuel injection based on the excess oxygen ratio; set a command injection quantity for the upcoming fuel injection based on the torque-producing fuel quantity and the fuel burning percentage; and control the fuel injector to inject the command injection quantity of fuel into the cylinder in the upcoming fuel injection.

14 Claims, 5 Drawing Sheets

FIG.5
(a) OPENING DEGREE OF INTAKE THROTTLE 
(b) OPENING DEGREE OF EGR VALVE 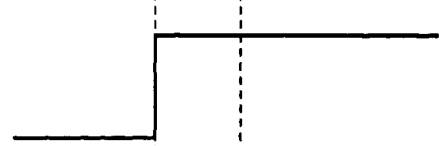
(c) COMMAND INJECTION QUANTITY 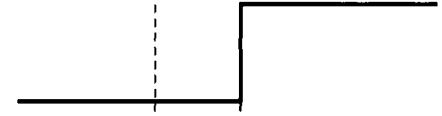
(d) EXCESS OXYGEN RATIO 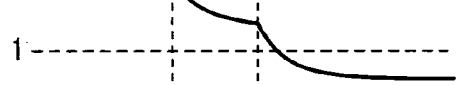
(e) AIR/FUEL RATIO 
(f) ENGINE TORQUE 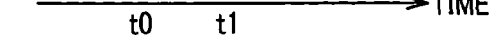

EXHAUST GAS CLEANING APPARATUS FOR INTERNAL COMBUSTION ENGINE

CROSS-REFERENCE TO RELATED APPLICATION

This application is based on and claims priority from Japanese Patent Application No. 2008-38715, filed on Feb. 20, 2008, the content of which is hereby incorporated by reference in its entirety into is application.

BACKGROUND OF THE INVENTION

1. Technical Field of the Invention

The present invention relates to exhaust gas cleaning apparatuses (or exhaust emission control devices) for internal combustion engines.

2. Description of the Related Art

A Lean $NO_x$ Trap (LNT) is generally disposed in the exhaust pipe of a lean burn internal combustion engine, such as a diesel engine, to reduce the nitrogen oxides ($NO_x$) contained in the exhaust gas from the engine. The LNT is configured to absorb the $NO_x$ when the exhaust gas is lean and reduce the absorbed $NO_x$ to harmless nitrogen ($N_2$) and water ($H_2O$) when the exhaust gas becomes rich.

Moreover, there are known three approaches for making the normally lean exhaust gas turn to rich. The first approach is to perform rich-burn combustion, that is, to increase the quantities of fuel injected into cylinders of the engine, thereby making the air/fuel mixture in the cylinders rich. The second approach is to perform a post injection in each of the cylinders when the combustion in the cylinder caused by a main injection has almost completed. The third approach is to install an additional fuel injector on the exhaust pipe to inject fuel directly to the LNT.

In addition, there are also known various approaches for improving the performance of a LNT. For example, Japanese Patent First Publication No. 2006-336518 discloses an exhaust emission control system which estimates the deterioration degree of a LNT based on a detection value of an oxygen concentration sensor and sets the length of a lean-burn combustion period based on the estimated deterioration degree.

Among the above-mentioned three approaches for making the exhaust gas turn from lean to rich, the first approach is most advantageous in terms of NOx reduction efficiency and minimization of additional fuel injection.

However, in applying the first approach, there is a problem of "torque shock" to be solved. The problem will be described hereinafter with reference to FIG. 5.

FIG. 5 shows changes in the opening degree of an intake throttle, the opening degree of an EGR (Exhaust Gas Recirculation) valve, command injection quantity, excess oxygen ratio, the air/fuel ratio, and the torque of the engine during a time period of shifting the combustion in the cylinders of the engine from a lean-burn mode to a rich-burn mode.

More specifically, at a timing to, an ECU (Electric Control Unit) for controlling operation of the engine issues a command to shift the combustion in the cylinders of the engine from the lean-burn mode to the rich-burn mode. Then, the opening degree of the intake throttle is decreased in one step, while the opening degree of the EGR valve is increased in one step. As a result, the quantity of air inducted into each of the cylinders of the engine is gradually decreased, thereby decreasing both the excess oxygen ratio and air/fuel ratio in each of the cylinders.

Hereinafter, the excess oxygen ratio denotes the ratio of the quantity of oxygen currently present in each of the cylinders of the engine to the quantity of oxygen present in each of the cylinders when the air/fuel ratio is stoichiometric. It should be noted that the excess oxygen ratio is equal to the excess air ratio in each of the cylinders provided that the percentage of oxygen in air is constant. In addition, the opening degrees of the intake throttle and EGR valve in each of the lean-burn and rich-burn modes may be preset to suitable values.

Further, at a timing t1 later than the timing t0, the command injection quantity is increased in one step. Then, the quantity of fuel injected into each of the cylinders of the engine is accordingly increased. As a result, both the excess oxygen ratio and air/fuel ratio in each of the cylinders are her decreased, thereby making the exhaust gas rich.

The purpose of setting the timing t1 later than the timing t0 is to increase the quantity of fuel injected into each of the cylinders of the engine after decreasing the quantity of air in each of the cylinders, so as to suppress the increase in the torque of the engine which is caused by the increase in the quantity of fuel. In addition, the time interval between the timings t0 and t1 may be preset in consideration of the decrease in the quantity of air in each of the cylinders which is caused by the decreases in the opening degrees of the intake throttle and EGR value.

However, in some cases, the quantity of air in each of the cylinders of the engine cannot be sufficiently decreased by the timing t1 due to changes in the ambient condition and the manufacturing tolerances of the intake throttle and EGR valve. As a result, as shown in FIG. 5, a torque shock (i.e., a rapid increase in the torque of the engine) is ca-used by the increase in the command injection quantity at the timing t1.

The above-described problem of torque shock has not yet been successfully solved by the prior art including Japanese Patent First Publication No. 2006-336518.

SUMMARY OF THE INVENTION

According to the present invention, there is provided an exhaust gas cleaning apparatus for cleaning the exhaust gas from an internal combustion engine.

The engine includes at least one cylinder and combustion in the cylinder has a lean-burn mode and a rich-burn mode. In the lean-burn mode, the air/fuel mixture in the cylinder is lean; in the rich-burn mode, the air/fuel mixture in the cylinder is rich.

The exhaust gas cleaning apparatus includes a Lean $NO_x$ Trap (LNT) and a combustion mode shifter. The LNT is provided in an exhaust passage of the engine through which the exhaust gas flows. The LNT is configured to absorb $NO_x$ contained in the exhaust gas when the exhaust gas is lean and reduce the absorbed $NO_x$ when the exhaust gas turns to rich. The combustion mode shifter shifts the combustion in the cylinder from the lean-burn mode to the rich-burn mode, thereby making the exhaust gas turn from lean to rich.

The combustion mode shifter includes: (1) a first estimating means for estimating a torque-producing fuel quantity for a fuel injection which is made by a fuel injector into the cylinder when the combustion in the cylinder is in the lean-burn mode, the torque-producing fuel quantity representing the quantity of fuel which is injected into the cylinder through the fuel injection and burnt in the cylinder to produce torque of the engine; (2) a second estimating means for estimating an excess oxygen ratio for an upcoming fuel injection which is to be made by the fuel injector into the cylinder during a time period of shifting the combustion in the cylinder from the lean-burn mode to the rich-burn mode, wherein the excess oxygen ratio is estimated based on a cylinder oxygen quantity, which represents the quantity of oxygen currently present in the cylinder, and a command injection quantity for a previous fuel injection made by the fuel injector; (3) a third estimating means for estimating a fuel burning percentage for the upcoming fuel injection based on the excess oxygen ratio estimated by the second estimating means; (4) a setting means for setting a command injection quantity for the upcoming fuel injection based on the torque-producing fuel quantity estimated by the first estimating means and the fuel burning percentage estimated by the third estimating means; (5) and a controlling means for controlling the fuel injector to inject the command injection quantity, set by the setting means, of the fuel into the cylinder in the upcoming fuel injection.

With the above configuration, the command injection quantity for the upcoming fuel injection, which is to be made during the time period of shifting the combustion from the lean-burn mode to the rich-burn mode, is set based on the torque-producing fuel quantity for the fuel injection which is made when the combustion is in the lean-burn mode and the fuel burning percentage for the upcoming fuel injection. Consequently, the torque-producing fuel quantity for the upcoming fuel injection can be made equal to that for the fuel injection made when the combustion is in the lean-burn mode. As a result, it is possible to reliably prevent a torque shock from occurring during the time period of shifting the combustion from the lean-burn mode to the rich-burn mode.

Moreover, with the above configuration, the excess oxygen ratio for the upcoming fuel injection is estimated based on the command injection quantity for the previous fuel injection, instead of the command injection quantity for the upcoming fuel injection which has not yet been set at the time the estimation of the excess oxygen ratio is made. Consequently, it is possible to suitably estimate the excess oxygen ratio, thereby allowing the command injection quantity for the upcoming fuel injection to be suitably set to prevent occurrence of a torque shock.

According to further implementations of the invention, when the excess oxygen ratio estimated by the second estimating means is less than a predetermined value, the setting means sets the command injection quantity to a predetermined quantity which represents a command injection quantity for a fuel injection made when the combustion in the cylinder is in the rich-burn mode.

With the above configuration, when the excess oxygen ratio is less than the predetermined value, there is almost no risk of the upcoming fuel injection causing a torque shock to occur. Therefore, the setting means sets the command injection quantity to the predetermined quantity, thereby accelerating the sting of the combustion in the cylinder from the lean-burn mode to the rich-burn mode. As a result, the NOx reduction by the LNT can be started as well as terminated earlier, thereby decreasing the amount of fuel consumed for the NOx reduction. On the other hand, when the excess oxygen ratio is greater than or equal to the predetermined value, there still remains the risk of the upcoming fuel injection causing a torque shock to occur. Therefore, the setting means sets the command injection quantity based on the torque-producing fuel quantity estimated by the first estimating means and the fuel burning percentage estimated by the third estimating means, thereby preventing a torque shock from occurring due to the upcoming fuel injection.

The exhaust gas cleaning apparatus further includes an Exhaust Gas Recirculation (EGR) passage for recirculating part of the exhaust gas from the exhaust passage to the cylinder. The second estimating means estimates the cylinder oxygen quantity based on a quantity of air inducted into the cylinder via an intake passage of the engine and a quantity of exhaust gas recirculated into the cylinder via the EGR passage.

With the above configuration, the second estimating means can accurately estimate the cylinder oxygen quantity, which represents the quantity of oxygen currently present in the cylinder, thereby accurately estimating the excess oxygen ratio based on the accurately-estimated cylinder oxygen quantity.

The second estimating means estimates the quantity of exhaust gas recirculated into the cylinder via the EGR passage based on the difference between a total quantity of gas inducted into the cylinder and the quantity of air inducted into the cylinder via the intake passage. Moreover, the second estimating means estimates the total quantity of gas inducted into the cylinder based on bot the pressure and temperature inside an intake manifold of the engine.

In estimating the excess oxygen ratio, the second estimating means first computes a reference oxygen quantity as the product of the stoichiometric air/fuel ratio, the command injection quantity for the previous fuel injection, and the percentage of oxygen in air. Then, the second estimating means estimates the excess oxygen ratio as the ratio of the cylinder oxygen quantity to the reference oxygen quantity.

The internal combustion engine may be a diesel engine.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 5 is a time chart illustrating the problem of torque shock encountered with the prior art.

DESCRIPTION OF PREFERRED EMBODIMENTS

Preferred embodiments of the present invention will be described hereinafter with reference to FIGS. 1-4.

First Embodiment

Figure 1:
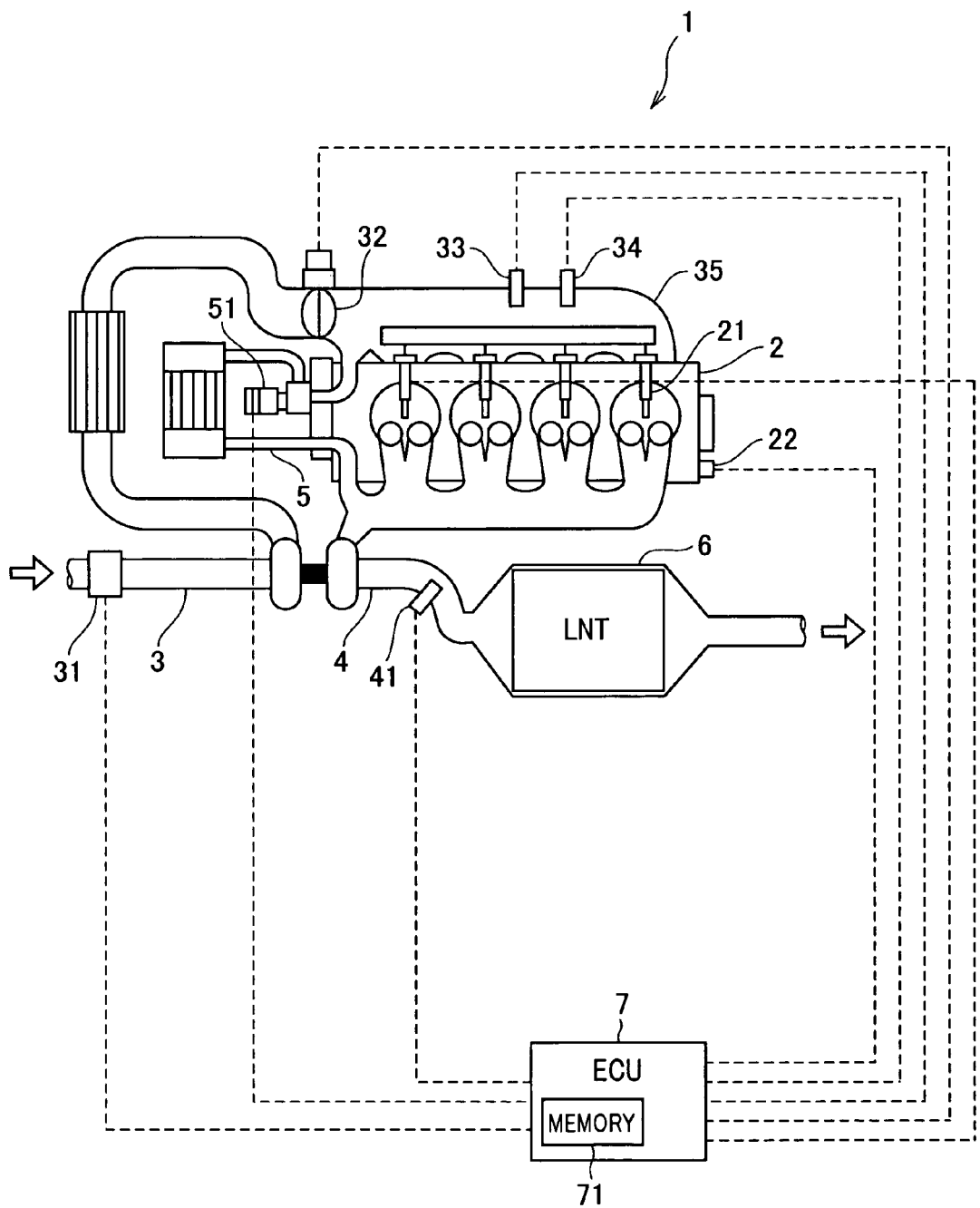
FIG. 1 is a schematic view showing the overall configuration of an exhaust gas cleaning apparatus for a diesel engine according to the first embodiment of the invention.

FIG. 1 shows the overall configuration of an exhaust gas cleaning apparatus 1 according to the first embodiment of the invention.

The exhaust gas cleaning apparatus 1 is designed to reduce the nitrogen oxides ($NO_x$) contained in the exhaust gas from a four-cylinder diesel engine 2. Around the diesel engine 2, there are provided an intake pipe 3, an exhaust pipe 4, an Exhaust Gas Recirculation (EGR) pipe 5, a Lean NO$_x$ Trap (LNT) 6, and an Electronic Control Unit (ECU) 7.

The engine 2 is supplied with fresh air from the intake pipe 3 via an intake manifold 35.

In the intake pipe 3, there are arranged an air flow meter 31 and an intake throttle 32. The air flow meter 31 measures the flow rate of the intake air (i.e., the fresh air) supplied to the engine 2 and outputs to the ECU 7 a signal that indicates the measured flow rate. The intake throttle 32 is located downstream of the air flow meter 31 and serves to adjust the flow rate of the intake air.

On the intake manifold 35, there are mounted an intake pressure sensor 33 and an intake temperature sensor 34. The intake pressure sensor 33 senses the intake pressure inside the intake manifold 35 and outputs to the ECU 7 a signal that indicates the sensed intake pressure. The intake temperature sensor 34 senses the intake temperature inside the intake manifold 35 and outputs to the ECU 7 a signal that indicates the sensed intake temperature.

The engine 2 is also equipped with four fuel injectors 21 and an engine speed sensor 22. Each of the fuel injectors 21 injects fuel into a corresponding one of the cylinders of the engine 2. The engine speed sensor 22 senses the speed of the engine 2 and outputs to the ECU 7 a signal that indicates the sensed speed. In addition, the engine speed sensor 22 may be implemented by a crank angle sensor that senses the rotation angle of a crankshaft (not shown) of the engine 2.

The exhaust gas from the engine 2 is discharged to the exhaust pipe 4. On the exhaust pipe 4, there is mounted an Air/Fuel (A/F) ratio sensor 41. The A/F ratio sensor 41 senses the air/fuel ratio of the exhaust gas and outputs to the ECU 7 a signal that indicates the sensed air/fuel ratio.

The engine 2 is further equipped with an EGR system which is configured with the EGR pipe 5 and an EGR valve 51. The EGR pipe 5 branches off from the exhaust pipe 4 to recirculate part of the exhaust gas back to the intake manifold 35. The EGR valve 51 is mounted on the EGR pipe 5 to adjust the flow rate of the recirculated exhaust gas.

The LNT 6 is arranged in the exhaust pipe 4 downstream from the A/F ratio sensor 41. The LNT 6 is configured with, for example, a ceramic base, a support provided on the ceramic base, and a NOx-absorbing member and a catalyst both of which are supported on the support. The support is preferably made of gamma alumina so as to have a sufficiently large surface area for supporting the NOx-absorbing member and the catalyst. The NOx-absorbing member may be made of, for example, barium, lithium, or potassium. The catalyst may be made of, for example, platinum.

The LNT 6 absorbs the NOx contained in the exhaust gas when the exhaust gas is lean (generally, with the A/F ratio being above 17). Moreover, when the exhaust gas turns to rich (generally, with the A/F ratio being below 14.5) and the temperature of the exhaust gas falls in a predetermined range (for example, higher than 300° C. for allowing the catalyst to normally function), the NOx absorbed in the LNT 6 is reduced to harmless nitrogen ($N_2$) and water ($H_2O$) by a reducing agent produced from the components of the fuel.

Further, it is possible to make the exhaust gas turn from lean to rich by shifting the combustion in the cylinders of the engine 2 from the lean-burn mode to the rich-burn mode. In the lean-burn mode, the quantities of air inducted into the cylinders of the engine 2 are large and the quantities of fuel injected by the fuel injectors 21 into the cylinders of the engine 2 are small, making the air/fuel mixture in the cylinders lean. On the other hand, in the rich-burn mode, the quantities of air inducted into the cylinders of the engine 2 are small and the quantities of fuel injected by the fuel injectors 21 into the cylinders of the engine 2 are large, making the air/fuel mixture in the cylinders rich.

The ECU 7 is configured with a microcomputer which includes a CPU (not shown), a memory 71, and I/O devices (not shown). The ECU 7 controls operations of the diesel engine 2 and the exhaust gas cleaning apparatus 1. More specifically, the ECU 7 inputs the signals output from the air flow meter 31, the intake pressure sensor 33, the intake temperature sensor 34, the engine speed sensor 22, and the A/F ratio sensor 41. Then, based on the input signals, the ECU 7 sets the opening degrees of the intake throttle 32 and the EGR valve 51 as well as sets injection timings and injection quantities for the fuel injectors 21 to inject the fuel into the corresponding cylinders. Furthermore, the ECU 7 shifts the combustion in the cylinders of the engine 2 between the lean-burn and rich-burn modes according to the operating condition of the LNT 6.

Figure 2:
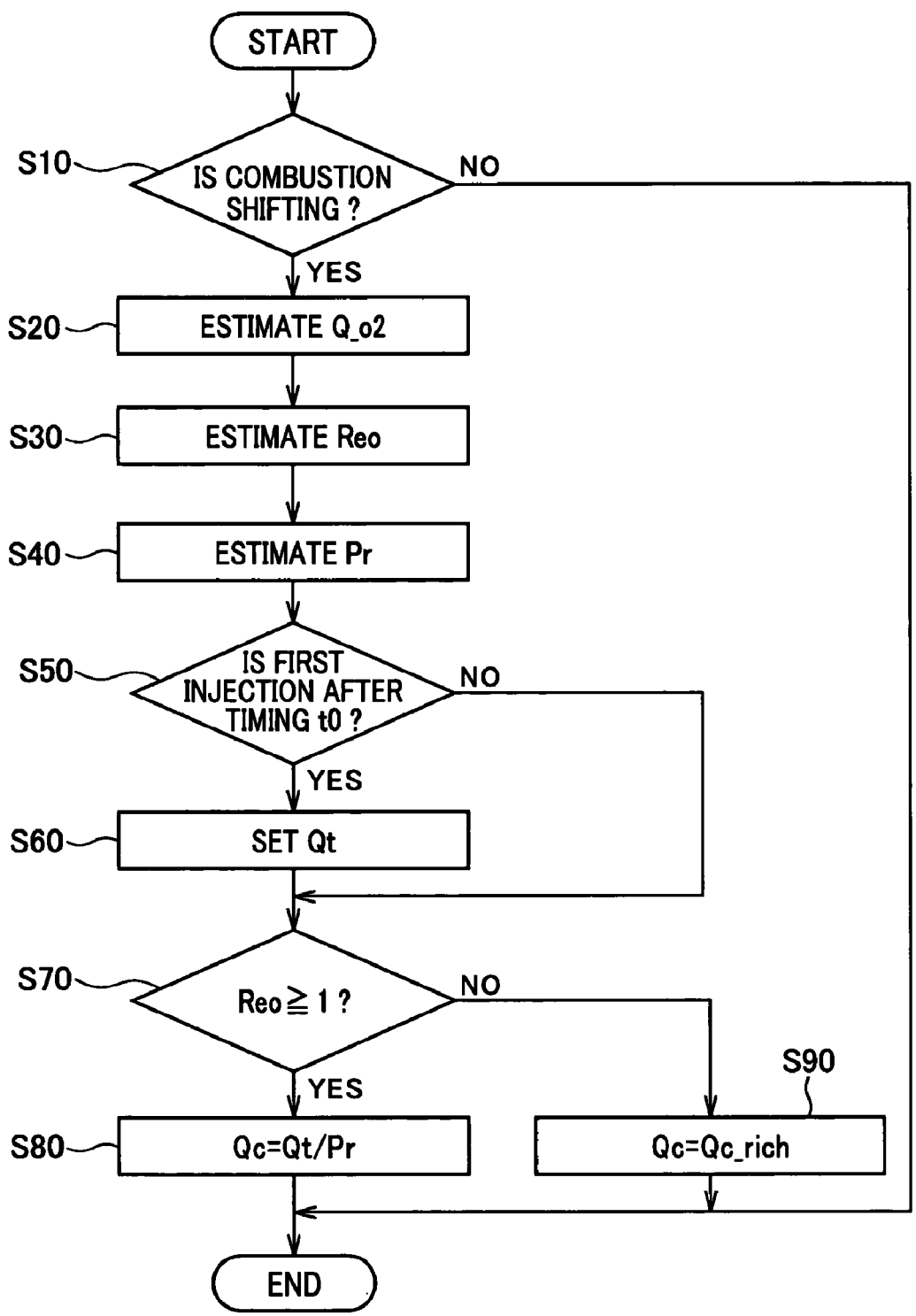
FIG. 2 is a flow chart illustrating a process of an ECU for setting a command injection quantity during a time period of shifting the combustion in the engine from the lean-burn mode to the rich-burn mode.

FIG. 2 shows a process of the ECU 7 for setting a command injection quantity Qc for each of the fuel injectors 21 during a time period of shifting the combustion in the corresponding cylinder from the lean-burn mode to the rich-burn mode. This process is repeatedly performed during the time period. More specifically, during the time period, this process is performed once for each combustion cycle in the cylinder within a time interval between the end of the intake stroke and the start of a fuel injection in the compression stroke for the combustion cycle.

First, in step S10, the ECU 7 determines whether it is in the time period of shifting the combustion from the lean-burn mode to the rich-burn mode.

Figure 3:
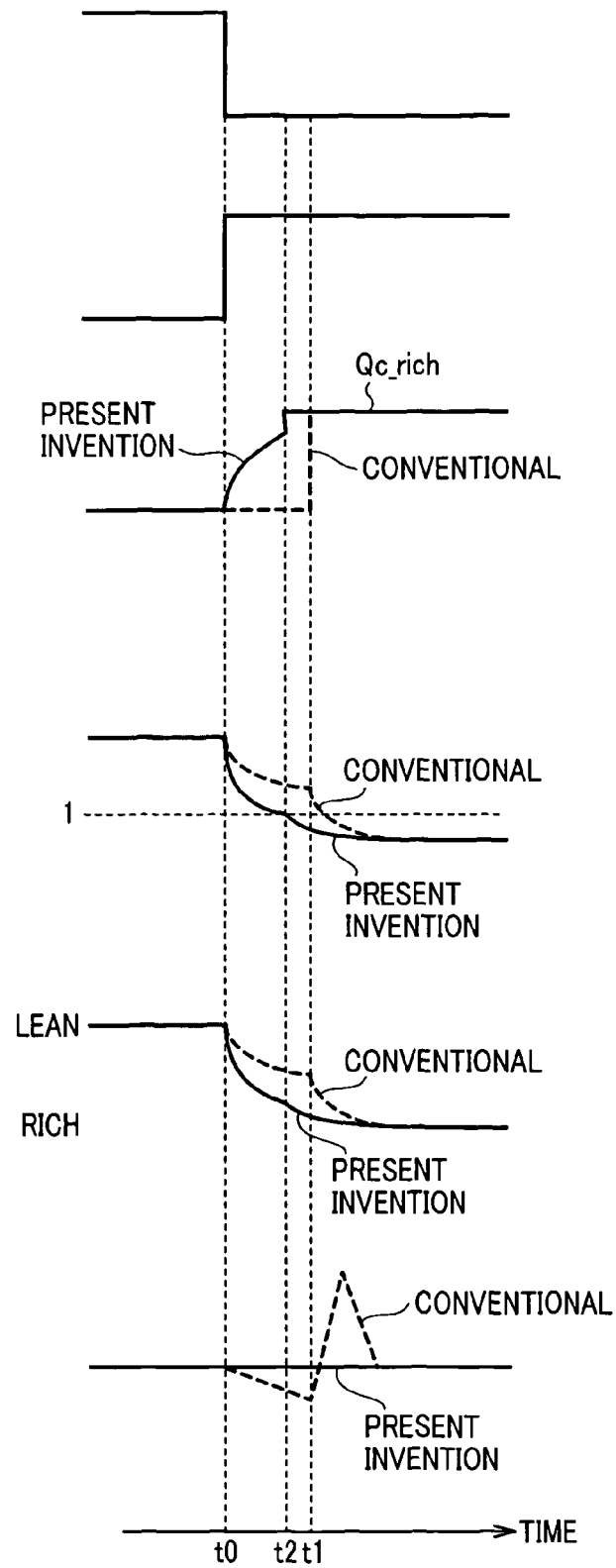
FIG. 3 is a time chart illustrating the advantages of the exhaust gas cleaning apparatus according to the first embodiment.

More specifically, referring to FIG. 3, the time period corresponds to the time interval between a timing t0 and a timing t2. At the timing t0, the ECU 7 issues a command to shift the combustion in the cylinder from the lean-burn mode to the rich-burn mode, causing the opening degrees of the intake throttle 32 and the EGR valve 51 to decrease in one step. At the timing t2, the command injection quantity Qc has increased to reach a predetermined quantity Qc_rich which represents a command injection quantity for a fuel injection made when the combustion in the cylinder is in the rich-burn mode.

Turning back to FIG. 2, if the determination in step S10 results in a "NO" answer, then the process directly goes to the end. Otherwise, if the determination in step S10 results in a "YES" answer, then the process proceeds to step S20.

In step S20, the ECU 7 estimates a cylinder oxygen quantity Q_o2 which represents the quantity of oxygen currently present in the cylinder.

More specifically, the cylinder oxygen quantity Q_o2 is estimated as the sum of an intake oxygen quantity and an EGR oxygen quantity. Hereinafter, the intake oxygen quantity denotes the quantity of oxygen inducted into the cylinder via the intake pipe 3; the EGR oxygen quantity denotes the quantity of oxygen recirculated into the cylinder via the EGR pipe 5. The intake oxygen quantity can be estimated as the product of the quantity of air inducted into the cylinder via the intake pipe 3 and the percentage of oxygen (i.e., about 23%) in air. Further, the quantity of air inducted into the cylinder can be estimated based on the flow rate of the intake air measured by the air flow meter 31. In addition, when the air flow meter 31 is located upstream from the intake throttle 32, it is possible to: 1) use a differential pressure sensor to sense the differential pressure between the upstream and downstream sides of the intake throttle 32; and 2) correct the flow rate of the intake air measured by the air flow meter 31 based on the differential pressure sensed by the differential pressure sensor. As to the EGR oxygen quantity, a method of estimating it will be described later in the second embodiment.

In step S30, the ECU 7 estimates an excess oxygen ratio Reo in the cylinder.

More specifically, the ECU 7 retrieves, from the memory 71, the command injection quantity for the previous fuel injection by the fuel injector 21. Then, the ECU 7 computes a reference oxygen quantity as the product of the stoichiometric air/fuel ratio, the command injection quantity for the previous fuel injection, and the percentage of oxygen in air. Thereafter, the ECU7 estimates the excess oxygen ratio Reo as the ratio of the cylinder oxygen quantity Q_o2 estimated in step S20 to the reference oxygen quantity.

In step S40, the ECU 7 estimates a fuel burning percentage Pr for the upcoming fuel injection, which represents the percentage of the quantity of fuel actually burnt in the cylinder relative to the quantity of fuel injected into the cylinder through the upcoming fuel injection.

Figure 4:
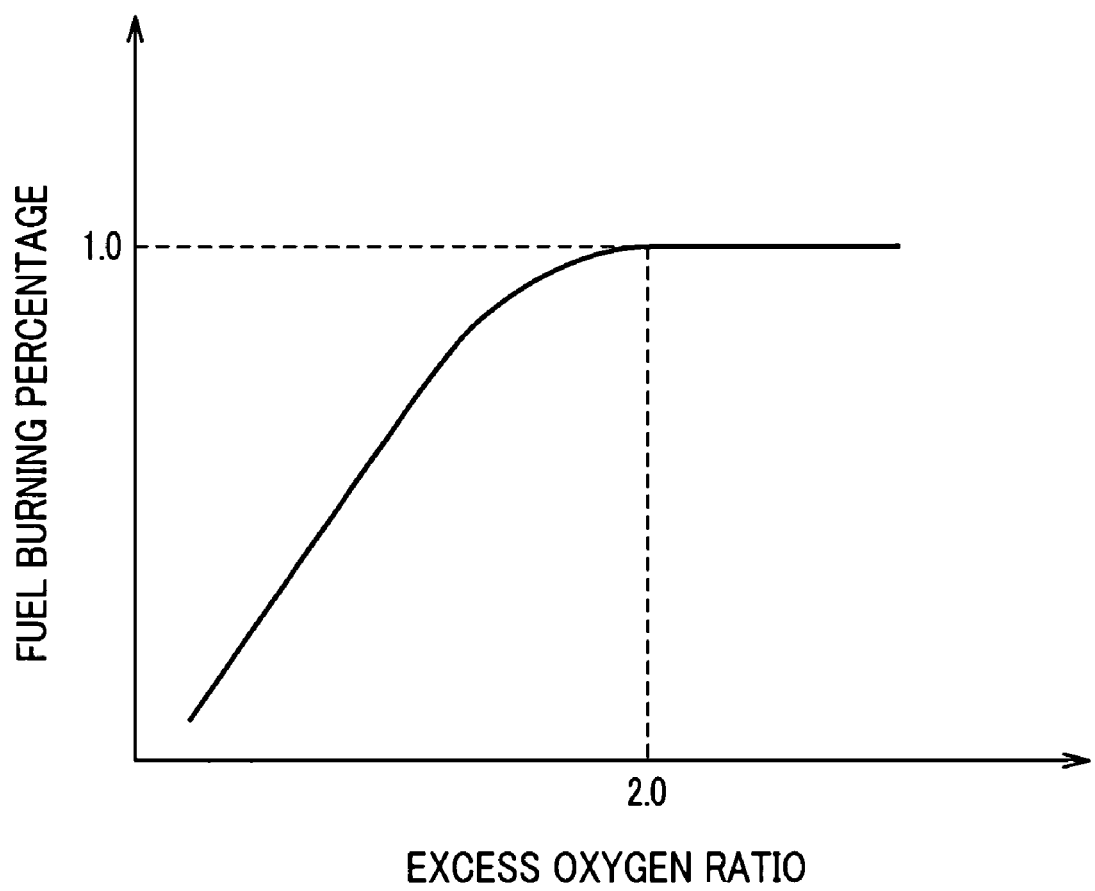
FIG. 4 is a graphical representation illustrating the relationship between the excess oxygen ratio and the fuel burning percentage in the engine.

More specifically, the inventors of the present invention have found that there is a relationship between the excess oxygen ratio and the fuel burning percentage as shown in FIG. 4. It can be seen from FIG. 4 that the fuel injected into the cylinder cannot be completely burnt at the excess oxygen ratio of 1.0, but can be completely burnt at the excess oxygen ratio of approximately 2.0. In the present embodiment, the relationship shown in FIG. 4 has been previously stored in the memory 71; the ECU 7 estimates, based on the relationship, the fuel burning percentage Pr at the excess oxygen ratio Reo estimated in step S30.

Returning to FIG. 2, in step 50, the ECU 7 determines whether the upcoming fuel injection is the first fuel injection for the fuel injector 21 after shifting the combustion from the lean-burn mode to the rich-burn mode (i.e., after the timing t0 in FIG. 3).

If the determination in step S50 results in a 'NO' answer, then the process jumps to step S70. Otherwise, if the determination in step S50 results in a "YES" answer, then the process proceeds to step S60.

In step S60, the ECU 7 sets a target torque-producing fuel quantity Qt for the upcoming fuel injection by the fuel injector 21.

Hereinafter, the torque-producing fuel quantity for a fuel injection denotes the quantity of fuel which is injected by the fuel injector 21 into the cylinder and burnt in the cylinder to produce the torque of the engine 2.

In the present embodiment, to prevent a torque shock from occurring during the time period of shifting the combustion from the lean-burn mode to the rich-burn mode, the target torque-producing fuel quantity Qt is set to the torque-producing fuel quantity for the last fuel injection in the lean-burn mode (i.e., the last fuel injection before the timing t0 in FIG. 3). More specifically, the ECU 7 sets the target torque-producing fuel quantity Qt by the following equation:

$$Qt = Qc\_lean \times Pl \qquad \text{(Equation 1)}$$

where Qc_lean is the command injection quantity for the last fuel injection in the lean-burn mode, and Pl is the fuel burning percentage for the last fuel injection in the lean-burn mode.

In addition, the parameter Pl can also be estimated by performing the above-described steps S20, S30, and S40, wherein the excess oxygen ratio Reo for the last fuel injection is estimated in step S30 using the command injection quantity Qc_lean for the last fuel injection instead of the command injection quantity for the previous fuel injection to the last fuel injection.

In succeeding step S70, the ECU 7 determines whether the excess oxygen ratio Reo estimated in step S30 is greater than or equal to 1.

If the determination in step S70 results in a "YES" answer, then the process proceeds to step S80.

In step S80, the ECU 7 sets the command injection quantity Qc by the following equation:

$$Qc = Qt/Pr \qquad \text{(Equation 2)}$$

where Qt is the target torque-producing fuel quantity set in step S60, and Pr is the fuel burning percentage estimated in step S40.

In addition, after setting the command injection quantity Qc as above, the ECU 7 controls the fuel injector 21 to inject the set quantity Qc of the fuel into the cylinder in the upcoming fuel injection, resulting in the torque-producing fuel quantity for the upcoming injection equal to that for the last fuel injection in the lean-burn mode. As a result, it is possible to prevent a torque-shock from occurring due to the upcoming fuel injection.

On the other hand, if the determination in step 70 results in a "NO" answer, then the process goes on to step S90.

In step S90, the ECU7 sets the command injection quantity Qc to the predetermined quantity Qc_rich (i.e., Qc=Qc_rich). As described above, Qc_rich represents the command injection quantity for a fuel injection made when the combustion in the cylinder is in the rich-burn mode. Moreover, Qc_rich it is so predetermined as to make the reduction of NOx in the LNT 6 possible.

In addition, after setting the command injection quantity Qc to the predetermined quantity Qc_rich, the ECU 7 controls the fuel injector 21 to inject the set quantity Qc of the fuel into the cylinder in the upcoming fuel injection, thereby accelerating the shifting of the combustion from the lean-burn mode to the rich-burn mode.

After each of steps S80 and S90, the process goes to the end.

As above, in the process according to the present embodiment, the ECU 7 sets the command injection quantity Qc in step S80 based on the target torque-producing fuel quantity Qt set in step S60 and the fuel burning percentage Pr estimated in step S40. Moreover, the ECU 7 estimates the fuel burning percentage Pr in step S40 based on the excess oxygen ratio Reo estimated in step S30. However, to estimate in step S30 the excess oxygen ratio Reo for the upcoming fuel injection, it is necessary to provide the command injection quantity Qc for the upcoming fuel injection prior to step S30.

That is to say, to set the command injection quantity Qc in step S80, it is necessary to first estimate the excess oxygen ratio Reo in step S30 based on the command injection quantity Qc. To solve such a contradiction, the inventors of the present invention have conceived the idea of using the command injection quantity for the previous fuel injection instead of the not-yet-set command injection quantity Qc for the upcoming fuel injection in step S30. As a result, it becomes possible to suitably set the command injection quantity Qc.

Further, in the process according to present embodiment, the ECU 7 sets the command injection quantity Qc in two different ways according to the excess oxygen ratio Reo. More specifically, when the excess oxygen ration Reo is greater than or equal to 1, in other words, when the air/fuel ratio in the cylinder has not yet been sufficiently decreased, there still remains the risk of the upcoming fuel injection causing a torque shock to occur. Therefore, the ECU 7 sets the command injection quantity Qc for the upcoming fuel injection using Equation 2, thereby preventing a torque shock from occurring due to the upcoming fuel injection. On the other hand, when the excess oxygen ration Reo is less than 1, in other words, when the air/fuel ratio in the cylinder has been sufficiently decreased, there is almost no risk of the upcoming fuel injection causing a torque shock to occur. Therefore, the ECU 7 sets the command injection quantity Qc to the predetermined quantity Qc_rich, thereby accelerating the shifting of the combustion from the lean-burn mode to the rich-burn mode.

FIG. 3 illustrates the advantages of the process according to the present embodiment with respect to the conventional process which has been previously described with reference to FIG. 5.

In FIG. 3, changes in the opening degree of the intake throttle 32, the opening degree of the EGR valve 51, the command injection quantity Qc, the excess oxygen ratio, the air/fuel ratio in the cylinder, and the torque of the engine 2 are indicated with solid lines for the process according to the present embodiment and with dashed lines for the conventional process.

As seen from FIG. 3, in the case of performing the conventional process, the command injection quantity Qc is increased in one step at the timing t1, causing a torque shock to occur.

In comparison, in the case of performing the process according to the present embodiment, the command injection quantity Qc is first gradually increased in the time period from the timing t0 to the timing t2, causing both the excess oxygen ratio and air/fuel ratio to decrease fast.

Upon the excess oxygen ratio having been decreased to 1 at the timing t2, the command injection quantity Qc is then increased in one step to the predetermined quantity Qc_rich. However, in this case, since the air/fuel ratio in the cylinder has been sufficiently decreased by the timing t2, the one-step increase in the command injection quantity Qc causes almost no change in the torque of the engine 2, preventing a torque shock from occurring.

Further, as seen from FIG. 3, the time required for shifting the combustion in the cylinder from the lean-burn mode to the rich-burn mode is equal to (t2−t0) in the case of performing the process according to the present invention, but equal to (t1−t0) in the case of performing the conventional process. That is to say, by performing the process according to the present embodiment, it is possible to more quickly shift the combustion in the cylinder from the lean-burn mode to the rich-burn mode.

In addition, in the present embodiment, the ECU 7 serves as a combustion mode shifter to shift the combustion in the cylinder from the lean-burn mode to the rich-burn mode, thereby making the exhaust gas turn from lean to rich. Moreover, in FIG. 2, step S60 corresponds to means for estimating the torque-producing fuel quantity for the last fuel injection in the lean-burn mode; step S30 corresponds to means for estimating the excess oxygen ratio Reo in the cylinder for an upcoming fuel injection; step S40 corresponds to means for estimating the fuel burning percentage Pr for the upcoming fuel injection; and steps S80 and S90 correspond to means for setting the command injection quantity Qc for the upcoming fuel injection. Furthermore, the ECU 7 also functions to control the fuel injector 21 to inject the command injection quantity Qc of the fuel into the cylinder in the upcoming fuel injection.

Second Embodiment

This embodiment illustrates a method of estimating the EGR oxygen quantity (i.e., the quantity of oxygen recirculated into the cylinder via the EGR pipe 5). In addition, with respect to the method, extra information can be obtained from Japanese Patent First Publication No. 2002-327634.

First, the ECU 7 estimates the total quantity Mcld of gas inducted into the cylinder via the intake manifold 35.

More specifically, the ECU 7 determines both the intake pressure Pm and intake temperature Tm inside the intake manifold 35 based on the signals output from the intake pressure sensor 33 and intake temperature sensor 34. Then, the ECU 7 computes the volumetric efficiency b of the engine 2 as a function of the intake pressure Pm and the speed Ne of the engine 2 sensed by the engine speed sensor 22; the function has been previously determined and stored in the memory 71 of the ECU 7. Thereafter, the ECU 7 estimates the total quantity Mcld of gas inducted into the cylinder by the following equation:

$$Mcld = Pm \times Vcld \times b / (R \times Tm) \qquad \text{(Equation 3)}$$

where Vcld is the volume of the cylinder, and R is the gas constant.

Secondly, the ECU 7 estimates the quantity MDth of the intake air (i.e., the fresh air) inducted into the cylinder via the intake manifold 35.

More specifically, the ECU 7 determines the flow rate Mafm of the intake air flowing into the intake pipe 3 based on the signal output from the air flow meter 31. Then, the ECU 7 computes the difference ΔP in the intake pressure Pm between the present and previous combustion cycles in the cylinder. Thereafter, the ECU estimates the quantity MDth of the intake air inducted into the cylinder based on the following equation:

$$Mafm \times 2/c - MDth = \Delta P \times VIN / (Tm \times R) \qquad \text{(Equation 4)}$$

where VIN is the volume of the intake pipe 3, and c is the number of cylinders of the engine 2. In addition, Equation 4 represents the law of conservation of mass for the intake pipe 3.

Thirdly, the ECU 7 estimates the quantity Megr of EGR gas recirculated into the cylinder via the intake manifold 35 by the following equation:

$$Megr = Mcld = MDth + \Delta P \Delta Vm / (Tm \times R) \qquad \text{(Equation 5)}$$

where Vm is the volume of the intake manifold 35. In addition, Equation 5 represents the law of conservation of mass for the intake manifold 35.

As seen from Equation 5, the quantity Megr of EGR gas recirculated into the cylinder is almost equal to the difference between the total quantity Mcld of gas inducted into the cylinder and the quantity MDth of the intake air inducted into the cylinder.

Finally, the ECU 7 estimates, as the EGR oxygen quantity, the quantity of oxygen contained in the quantity Megr of EGR gas recirculated into the cylinder based on the air/fuel ratio sensed by the A/F ratio sensor 41.

While the above particular embodiments of the present invention have been shown and described, it will be understood by those skilled in the art that various modifications, changes, and improvements may be made without departing from the spirit of the present invention.

For example, in step S70 of the process shown in FIG. 2, the ECU 7 determines whether the excess oxygen ratio Reo is greater than or equal to 1.

However, the ECU 7 may use, instead of 1, any other value in the range of 1 to 1.2 in the determination in step S70. In addition, the greater the used value is, the earlier the process turns to step S90 to accelerate the shifting of the combustion from the lean-burn mode to the rich-burn mode. On the other hand, the smaller the used value is, the more times step S80 is repeated to reliably prevent a torque shock from occurring. In practical uses, the value may be flexibly selected according to the operating conditions of the engine 2 and the LNT 6.

Moreover, in the second embodiment, instead of the total quantity Mcld of gas inducted into the cylinder, the quantity of the exhaust gas discharged out of the cylinder may be used in the estimation of the EGR oxygen quantity. In this case, it is possible to arrange an exhaust gas flow meter in the exhaust pipe 4 and estimate the quantity of the exhaust gas discharged out of the cylinder based on the flow rate of the exhaust gas measured by the exhaust gas flow meter. Alternatively, it is also possible to install both an exhaust gas pressure sensor and an exhaust gas temperature sensor on the exhaust pipe 4 and estimate the quantity of the exhaust gas discharged out of the cylinder based on the flow rate of the intake air sensed by the flow meter 31 and the pressure and temperature of the exhaust gas sensed by the exhaust gas pressure sensor and exhaust gas temperature sensor.

In the previous embodiments, the present invention is applied to the exhaust gas cleaning apparatus 1 for cleaning the exhaust gas from the diesel engine 2. However, the present invention can also be applied to an exhaust gas cleaning apparatus for cleaning the exhaust gas from, for example, a lean burn gasoline engine.

What is claimed is:

1. An exhaust gas cleaning apparatus for cleaning exhaust gas from an internal combustion engine, the engine including at least one cylinder and combustion in the cylinder has a lean-burn mode and a rich-burn mode, in the lean-burn mode the air/fuel mixture in the cylinder being lean, in the rich-burn mode the air/fuel mixture in the cylinder being rich, the exhaust gas cleaning apparatus comprising:

a Lean $NO_x$ Trap (LNT) provided in an exhaust passage of the engine through which the exhaust gas flows, the LNT being configured to absorb $NO_x$ contained in the exhaust gas when the exhaust gas is lean and reduce the absorbed $NO_x$ when the exhaust gas turns to rich; and an electronic control unit configured, with executable programmed logic, to perform:
 a combustion mode shift to shift the combustion in the cylinder from the lean-burn mode to the rich-burn mode, thereby making the exhaust gas turn from lean to rich, the combustion mode shift comprising:
  a first estimation to estimate a torque-producing fuel quantity for a fuel injection which is made by a fuel injector into the cylinder when the combustion in the cylinder is in the lean-burn mode, the torque-producing fuel quantity representing the quantity of fuel which is injected into the cylinder through the fuel injection and burnt in the cylinder to produce torque of the engine;
  a second sing estimation to estimate an excess oxygen ratio for an upcoming fuel injection which is to be made by the fuel injector into the cylinder during a time period of shifting the combustion in the cylinder from the lean-burn mode to the rich-burn mode, the excess oxygen ratio being estimated based on a cylinder oxygen quantity, which represents the quantity of oxygen currently present in the cylinder, and a command injection quantity for a previous fuel injection made by the fuel injector;
  a third estimation to estimate a fuel burning percentage for the upcoming fuel injection based on the excess oxygen ratio estimated by the second estimation; and
  set a command injection quantity for the upcoming fuel injection based on the torque-producing fuel quantity estimated by the first estimation and the fuel burning percentage estimated by the third estimation; and
  control the fuel injector to inject the command injection quantity, set by the setting unit, of the fuel into the cylinder in the upcoming fuel injection.

2. The exhaust gas cleaning apparatus as set forth in claim 1, wherein when the excess oxygen ratio estimated by the second estimation is less than a predetermined value, the setting unit sets the command injection quantity to a predetermined quantity which represents a command injection quantity for a fuel injection made when the combustion in the cylinder is in the rich-burn mode.

3. The exhaust gas cleaning apparatus as set forth in claim 1, further comprising an Exhaust Gas Recirculation (EGR) passage for recirculating part of the exhaust gas from the exhaust passage to the cylinder,
 wherein the second estimation estimates the cylinder oxygen quantity based on a quantity of air inducted into the cylinder via an intake passage of the engine and a quantity of exhaust gas recirculated into the cylinder via the EGR passage.

4. The exhaust gas cleaning apparatus as set forth in claim 3, wherein the second estimation estimates the quantity of exhaust gas recirculated into the cylinder via the EGR passage based on the difference between a total quantity of gas inducted into the cylinder and the quantity of air inducted into the cylinder via the intake passage.

5. The exhaust gas cleaning apparatus as set forth in claim 4, wherein the second estimation estimates the total quantity of gas inducted into the cylinder based on both the pressure and temperature inside an intake manifold of the engine.

6. The exhaust gas cleaning apparatus as set forth in claim 1, wherein the second estimation first computes a reference oxygen quantity as the product of a stoichiometric air/fuel ratio, the command injection quantity for the previous fuel injection, and the percentage of oxygen in air, and then estimates the excess oxygen ratio as the ratio of the cylinder oxygen quantity to the reference oxygen quantity.

7. The exhaust gas cleaning apparatus as set forth in claim 1, wherein:
 the first estimation estimates the torque-producing fuel quantity based on both a command injection quantity for the last fuel injection in the lean-burn mode and a fuel burning percentage for the last fuel injection in the lean-burn mode,
 the fuel burning percentage for the last fuel injection in the lean-burn mode is estimated by the third estimation based on an excess oxygen ratio for the last fuel injection in the lean burn-mode, and
 the excess oxygen ratio for the last fuel injection in the lean burn-mode is estimated by the second estimation based on the stoichiometric air/fuel ratio, the command injection quantity for the last fuel injection in the lean-burn mode, and the percentage of oxygen in air.

8. A method of cleaning exhaust gas from an internal combustion engine, wherein the engine includes at least one cylinder and combustion in the cylinder has a lean-burn mode and a rich-burn mode, in the lean-burn mode the air/fuel mixture in the cylinder being lean, in the rich-burn mode the air/fuel mixture in the cylinder being rich, the method comprising:
 absorbing, using a Lean $NO_x$ Trap (LNT) provided in an exhaust passage of the engine through which the exhaust gas flows, $NO_x$ contained in the exhaust gas when the exhaust gas is lean and reducing the absorbed $NO_x$ when the exhaust gas turns to rich; and shifting the combustion in the cylinder from the lean-burn mode to the rich-burn mode, thereby making the exhaust gas turn from lean to rich, wherein the shifting includes:

estimating a torque-producing fuel quantity for a fuel injection which is made by a fuel injector into the cylinder when the combustion in the cylinder is in the lean-burn mode, the torque-producing fuel quantity representing the quantity of fuel which is injected into the cylinder through the fuel injection and burnt in the cylinder to produce torque of the engine;

estimating an excess oxygen ratio for an upcoming fuel injection which is to be made by the fuel injector into the cylinder during a time period of shifting the combustion in the cylinder from the lean-burn mode to the rich-burn mode, wherein the excess oxygen ratio is estimated based on a cylinder oxygen quantity, which represents the quantity of oxygen currently present in the cylinder, and a command injection quantity for a previous fuel injection made by the fuel injector;

estimating a fuel burning percentage for the upcoming fuel injection based on the estimated excess oxygen ratio;

setting a command injection quantity for the upcoming fuel injection based on the estimated torque-producing fuel quantity and the estimated fuel burning percentage; and controlling the fuel injector to inject the set command injection quantity of the fuel into the cylinder in the upcoming fuel injection.

9. The method as set forth in claim 8, wherein when the estimated excess oxygen ratio is less than a predetermined value, the command injection quantity is set to a predetermined quantity which represents a command injection quantity for a fuel injection made when the combustion in the cylinder is in the rich-burn mode.

10. The method as set forth in claim 8, further comprising:
recirculating, using an Exhaust Gas Recirculation (EGR) passage, part of the exhaust gas from the exhaust passage to the cylinder,
wherein the cylinder oxygen quantity is estimated based on a quantity of air inducted into the cylinder via an intake passage of the engine and a quantity of exhaust gas recirculated into the cylinder via the EGR passage.

11. The method as set forth in claim 10, wherein the quantity of exhaust gas recirculated into the cylinder via the EGR passage is estimated based on the difference between a total quantity of gas inducted into the cylinder and the quantity of air inducted into the cylinder via the intake passage.

12. The method as set forth in claim 11, wherein the total quantity of gas inducted into the cylinder is estimated based on both the pressure and temperature inside an intake manifold of the engine.

13. The method as set forth in claim 8, wherein a reference oxygen quantity is computed as the product of a stoichiometric air/fuel ratio, the command injection quantity for the previous fuel injection, and the percentage of oxygen in air, and then the excess oxygen ratio is estimated as the ratio of the cylinder oxygen quantity to the reference oxygen quantity.

14. The method as set forth in claim 8, wherein:
the torque-producing fuel quantity is estimated based on both a command injection quantity for the last fuel injection in the lean-burn mode and a fuel burning percentage for the last fuel injection in the lean-burn mode,
the fuel burning percentage for the last fuel injection in the lean-burn mode is estimated based on an excess oxygen ratio for the last fuel injection in the lean burn-mode, and
the excess oxygen ratio for the last fuel injection in the lean burn-mode is estimated based on the stoichiometric air/fuel ratio, the command injection quantity for the last fuel injection in the lean-burn mode, and the percentage of oxygen in air.

* * * * *

UNITED STATES PATENT AND TRADEMARK OFFICE
CERTIFICATE OF CORRECTION

| | |
|---|---|
| PATENT NO. | : 8,201,396 B2 |
| APPLICATION NO. | : 12/389531 |
| DATED | : June 19, 2012 |
| INVENTOR(S) | : Kawamura et al. |

It is certified that error appears in the above-identified patent and that said Letters Patent is hereby corrected as shown below:

Col. 11, in claim 1, line 52, please remove the word "sing".

Signed and Sealed this
Eleventh Day of September, 2012

David J. Kappos
*Director of the United States Patent and Trademark Office*